3,198,757
METHOD OF PREPARING POLYURETHANES
Michael A. Ricciardi, Fords, and William J. Considine, Franklin Township, Somerset County, N.J., assignors, by mesne assignments, to M&T Chemicals Inc., New York, N.Y., a corporation of Delaware
No Drawing. Filed June 12, 1961, Ser. No. 116,293
10 Claims. (Cl. 260—2.5)

This invention relates to the preparation of polyurethanes and more specifically to novel catalysts which may be particularly useful in preparing polyurethane foams by the so-called one-shot process.

It is well known that polyurethane can be prepared by reacting an organic polyfunctional isocyanate with an organic compound having reactive hydrogen atoms (as determined by the well-known Zerewitinoff determination) such as are found on e.g. a polyalkylene polyol, a polyester, a polyester amide, a polyalkylene ether, a polyacetal, or a polyalkylene thioether. When this reaction is conducted under anhydrous conditions, the resulting polyurethane may be non-porous. If a cellular or foamed product be desired, water and an excess isocyanate can be added to the mixture. An auxiliary blowing agent, such as a volatile fluorocarbon, may be employed. When water reacts with the excess isocyanate groups not previously reacted, carbon dioxide may be formed which is entrapped in the reaction mixture. The gelling time of the reaction mixture is commonly controlled preferably to be slightly longer than the rise time, so that the solidifying mass entraps therewithin the carbon dioxide gas thereby giving a foamed product.

As is well known to those skilled in the art, various materials have been employed as catalysts or activators in the formation of polyurethanes. Most common of these are amines, typically tertiary amines such as N-ethylmorpholine. These catalysts may have as their prime function the control of the gas forming reaction although they also may serve to catalyze the gelation reaction. Amines, while commonly used, are generally considered undesirable because they possess one or more of the following characteristics: high volatility which results in a high rate of loss from the reaction mixture, obnoxious odor, high solvent activity which may affect paint or other coating materials, toxicity, etc. The polyurethane products prepared from amine-catalyzed reactions also possess these undesirable features. The obnoxious odor severely limits the end uses to which these materials can be put. From the production standpoint, the stability of the conventional activators in the formulations is short, typically less than e.g. 4–5 hours, and careful supervision must be exercised in continuous production operations to insure that the activators are active when used.

A wide variety of other catalysts have been tried. Particularly in the one-shot reaction, the preparation of foamed polyurethanes requires a predetermined control of both the blowing or gas-forming reaction which liberates carbon dioxide, and the gelation or setting reaction which forms the fluid mixture into a more-or-less firm foam. It has been found that desired foam time or rise time should be about 70–120 seconds, typically 90 seconds, measured under commercial conditions at about 25° C. Similarly, it has also been found that the gel time should be at least as long as the rise time. Successful commercial operation requires that the gel time be about 70–130 seconds, preferably 110 seconds. Obviously the gel time must be sufficiently long to permit the fullest development of the foaming reaction.

Although many catalyst systems have been tried, there is no simple commercial system which will permit the production of catalytically formed polyurethane foams which are free of the amine-derived objections noted supra. Despite these objections, primarily the odor which severely limits the areas of application of the foams, amines are commonly employed because no satisfactory substitute has been found, particularly in one-shot systems.

It is an object of this invention to provide improved and odorless foamed products based on polyurethanes. Another object of this invention is to provide new activators or catalysts for the manufacture of foamed polyurethanes. Other objects will be apparent to those skilled in the art on inspection of the following description.

In accordance with certain aspects of this invention, the novel method of making cellular polyurethanes may comprise mixing an organic compound having reactive hydrogen atoms as determined by the Zerewitinoff determination having a molecular weight of at least about 500, an organic polyisocyanate, water, and a catalytic amount of a composition containing (a) a stannous soap gel catalyst $Sn(OCOR)_2$ and (b) a blowing catalyst $R'_3SnX$ wherein R and R' are hydrocarbon radicals and X is selected from the group consisting of negative residual portions of an organic carboxylic acid, a mercaptan, an alcohol, a phenol, and a halogen acid.

A variety of organic polyfunctional isocyanates may be used in the process of the present invention although diisocyanates are preferred in formulations. Suitable polyfunctional isocyanates include alkylene diisocyanates such as hexamethylene diisocyanate and decamethylene diisocyanate; arylene diisocyanates such as phenylene diisocyanates; tolylene diisocyanates; naphthalene diisocyanates; 4,4'-diphenylmethane diisocyanates; or isomers or mixtures of any of these. Triisocyanates typically obtained by the reaction of three moles of an arylene diisocyanate with the mole of a triol—for example, the reaction product formed from three moles of tolylene diisocyanate and one mole of hexanetriol or of trimethylol propane, may be employed. A preferred polyisocyanate is the mixture of 80% 2,4-tolylene diisocyanate and 20% 2,6-tolylene diisocyanate.

The organic compounds which may be employed in practice of this invention will be organic compounds having reactive hydrogen atoms which will react with organic polyfunctional isocyanates to give urethane polymers. These organic compounds include polyesters, polyethers, polyisocyanate modified polyesters, polyisocyanate modified polyester amides, alkylene glycols, polymercaptans, polyamines, polyisocyanate modified alkylene glycols, etc. It will be understood that these organic compounds may have active primary or secondary hydroxyl groups. The organic compound may be a hydroxyl-containing polyether or polyester including fatty acid glycerides. Polyesters, which are a preferred type of organic compound, may be obtained by esterification condensation reaction of e.g. an aliphatic dibasic carboxylic acid with a glycol or a triol or mixture thereof in proportions such that the resultant polyesters may contain predominantly terminal hydroxyl groups. Dibasic carboxylic acids suitable for preparing polyesters may include aliphatic and aromatic acids such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oils, hydrogenated castor oil, or blown natural oils.

Polyethers, another preferred type of organic compound, may include polyalkylene glycols, e.g. polyethylene glycols and polypropylene glycols, preferably having a molecular weight of at least 200.

Formation of the preferred foamed products of this invention may be accomplished in a one-shot system by reacting the organic compound with excess polyfunctional isocyanate in the presence of water and cell modifying agents, e.g. silicones such as trimethyl end-blocked dimethyl polysiloxanes. The polyfunctional isocyanate is typically present in amount of 5%–300%, say 40% by weight of the polyol. The water should be present in amount to react with the isocyanate to liberate sufficient gas to produce a foam of the desired physical characteristics. From 0.5% to 10%, say 5% water will give good results. The mixing of the constituents may be carried out at elevated temperature or at room temperature.

In a typical two-step operation, the organic compound may be reacted with excess polyfunctional isocyanate in the absence of water. Subsequently water and other agents may be added to the mixture.

In practice of this invention, the novel catalyst composition will include a blowing catalyst $R'_3SnX$ and a gel catalyst $Sn(OCOR)_2$. In the formula $R'_3SnX$, the symbol $R'$ represents a hydrocarbon radical, typically a radical which may be alkyl, aryl, alkaryl, aralkyl, alkenyl and cycloalkyl. $R'$ may be methyl, ethyl, propyl, iso-propyl, n-butyl, iso-butyl, tert-butyl, n-amyl, 3-methyl butyl, 2-methyl butyl, 1-methyl butyl, cyclopentyl, n-hexyl, cyclohexyl, heptyl, octyl, and other alkyls; vinyl propen-1-yl, allyl, butene-1-yl, butene-2-yl, and other alkenyls; phenyl, o-methyl phenyl, p-methyl phenyl, 2,5-dimethyl phenyl and other aryls; benzyl, β-phenyl vinyl, furoyl, etc. All of $R'$ need not all be the same although in the preferred embodiment they may be the same. In the preferred embodiment, $R'$ may be a lower alkyl, i.e. an alkyl having less than about 10 carbon atoms. Preferably $R'$ may be n-butyl.

In the formula $R'_3SnX$, X may be selected from the group consisting of negative residual portions of an organic carboxylic acid, a mercaptan, an alcohol, a phenol, and a halogen acid.

In the formula $R'_3SnX$, when X is a negative residual portion of an organic carboxylic acid, the acid may be cyclohexyl carboxylic acid, maleic acid, benzoic acid, cyanuric acid, oleic acid, pelargonic acid, stearic acid, methacrylic acid, lauric acid, butyric acid, etc. Other equivalent acids will be apparent to those skilled in the art.

When X is a negative residual portion of a mercaptan, the mercaptan may be lauryl mercaptan, 2-ethylhexyl thioglycolate, thiophenol, octyl mercaptan, etc.

When X is a negative residual portion of an alcohol, the alcohol may be methanol, 2-ethylhexanol, ethanol, cyclohexanol, etc.

When X is a negative residual portion of a phenol, the phenol may be phenol per se, t-butyl catechol, hydroquinone, bisphenol A, thio-bis(tert-butyl cresol) (sold under the trademark Santonox R by Monsanto Chemical Co.), pentachlorophenol, ortho-phenyl phenol, para-phenyl phenol, para-octyl phenol, para-methoxy phenol, para-nitrophenol, beta-naphthol, etc.

When X is a negative residual portion of a halogen acid, the acid may be hydrogen chloride or hydrogen bromide.

Typical preferred specific compounds include trimethyltin laurate, tributyltin laurate, triphenyltin laurate, tributyltin lauryl mercaptide, tributyltin para-methoxy phenoxide, tributyltin 2-ethylhexoxide, etc.

The stannous soap gel catalysts used in practice of this invention may commonly be made by neutralizing an aqueous solution of a stannous salt with the desired acid RCOOH; typically an aqueous solution of stannous chloride may be reacted with a solution of sodium oleate to give the compound stannous oleate, a typical example of the materials commonly thought to have the formula $Sn(OCOR)_2$. The formula $Sn(OCOR)_2$ will be used to designate these soaps which may be prepared as indicated.

In the stannous soap designated as $Sn(OCOR)_2$, R may be a hydrocarbon radical selected from the same group as that from which $R'$ may be selected. R and $R'$ may be same or different. In all cases, neither all the R's nor all the $R'$'s need be the same, although preferably they will be so.

Typical specific gel catalysts which may be employed may include: stannous 2-ethylhexoate, stannous oleate, etc.

In practice of the invention, the gelation catalyst and the blowing catalyst may be present in ratio of 0.01 to 5 parts, say 1 part of the former per part of the latter. In one preferred embodiment, when tributyltin laurate and stannous 2-ethylhexoate are used, the ratio will be approximately 1.

Preferably the catalyst mixture will be present in catalytic amount corresponding to 0.01 to 5, say 0.6 part by weight per 100 parts of polyol.

Practice of this invention according to its specific embodiments may be observed by forming a typical one-shot polyether flexible foam by mixing (a) 100 parts of polyalkylene polyol (the polyether triol formed as the condensation product between glycerine and propylene oxide, having a molecular weight of about 3000, a hydroxyl number of about 56, and sold under either the trademark Niax Triol LG–56 by Union Carbide Chemicals Co. or GP–3030 by Wyandotte Chemical Co.); (b) 1.0 part of cell modifying agent silicone (the Union Carbide Chemical Co.).

L–520 brand of trimethyl end-blocked dimethyl polysiloxane; (c) 38.6 parts of tolylene diisocyanate (80%/20% ratio of 2,4- and 2,6-isomers); (d) 2.9 parts of demineralized water; (e) 0.3 part of blowing catalyst $R'_3SnX$, (f) 0.3 part of gel catalyst. In Examples 1–27, the gel catalyst was stannous 2-ethylhexoate.

*Table I*

| Example No. | $R'_3SnX$ |
|---|---|
| 1 | Tributyltin—derivative of t-butyl catechol. |
| 2 | Tributyltin cyclohexyl carboxylate. |
| 3 | Tributyltin maleate. |
| 4 | Tributyltin cyanate. |
| 5 | Tributyltin lauryl mercaptate. |
| 6 | Tributyltin chloride. |
| 7 | Tributyltin oleate. |
| 8 | Tributyltin nonanoate. |
| 9 | Tributyltin stearate. |
| 10 | Tributyltin methacrylate. |
| 11 | Tributyltin derivative of hydroquinone. |
| 12 | Tributyltin derivative of Bisphenol A. |
| 13 | Tributyltin derivative of Santanox R. |
| 14 | Tributyltin pentachlorophenoxide. |
| 15 | Tributyltin orthophenyl phenoxide. |
| 16 | Tributyltin p-octyl phenoxide. |
| 17 | Tributyltin 2-ethyl hexoxide. |
| 18 | Tributyltin phenoxide. |
| 19 | Tributyltin p-phenyl phenoxide. |
| 20 | Tributyltin p-methoxy phenoxide. |
| 21 | Tributyltin p-nitro phenoxide. |
| 22 | Tributyltin methoxide. |
| 23 | Trimethyltin laurate. |
| 24 | Tributyltin laurate. |
| 25 | Tri n-octyltin laurate. |
| 26 | Triphenyltin laurate. |
| 27 | Tri n-amyltin laurate. |

In each of the examples, all the components of the formulation were vigorously stirred upon mixing. The reaction started substantially immediately as evidenced by foaming. The cellular polyurethane product foamed and gelled promptly. The rise time was noted as the time at which the foam had risen to its maximum height. The exotherm was measured by placing a thermometer in the foam and noting the highest temperature to which it rose. Immediately after the mass had foamed, the surface was scraped with a spatula; this was done at 5 second intervals. The gel time was that time when, after scraping, the material did not flow or knit back together. The gel and rise times obtained by these tests are readily correlatable with those obtained in commercial practice. The results are tabulated in Table II.

*Table II*

| Example No. | Rise Time (seconds) | Gel Time (seconds) | Exotherm, °C. |
| --- | --- | --- | --- |
| 1 | 90 | 95 | 112 |
| 2 | 90 | 95 | 116 |
| 3 | 165 | 185 | 110 |
| 4 | 120 | 135 | 113 |
| 5 | 90 | 100 | 112 |
| 6 | 150 | 165 | 112 |
| 7 | 110 | 120 | 110 |
| 8 | 120 | 130 | 107 |
| 9 | 110 | 120 | 104 |
| 10 | 110 | 120 | 104 |
| 11 | 105 | 120 | 110 |
| 12 | 90 | 100 | 113 |
| 13 | 90 | 100 | 110 |
| 14 | 125 | 135 | 104 |
| 15 | 110 | 120 | 102 |
| 16 | 85 | 95 | 116 |
| 17 | 90 | 100 | 110 |
| 18 | 105 | 115 | 110 |
| 19 | 105 | 110 | 112 |
| 20 | 90 | 95 | 120 |
| 21 | 118 | 125 | 110 |
| 22 | 105 | 115 | 116 |
| 23 | 75 | 85 | 110 |
| 24 | 75 | 85 | 116 |
| 25 | 105 | 115 | 110 |
| 26 | 90 | 100 | 107 |
| 27 | 75 | 85 | 113 |

Similarly selected reactions were run using other polyols (e.g. specifically the glycol-adipate type polyester resin having a hydroxyl number of 49–55 sold under the trademark Foamrez-50 by Witco Chemical Co. having a clear appearance, a Gardner color of 2.0, a specific gravity of 1.19 at 25° C., a viscosity (Brookfield Model LVF, spindle No. 4, 12 r.p.m.) of 19,500 cps. at 25° C., an acid number of 1.7, and a water content (Karl Fischer) of 0.07% as set forth at page 82 of the Witco Chemical Co., Inc., catalog, ninth edition (1959)) and with other gel catalyst stannous compounds e.g. stannous oleate. The product foams were comparable to those noted in the above table.

A control reaction was carried out using 0.3 part of tributyltin laurate as the gel catalyst and 0.3 part of N-ethylmorpholine as the blowing catalyst. This product was characterized by an undesirable amine odor, by a rise time of 235 seconds, and no apparent gel strength. In another control reaction, 0.3 part of tributyltin cyclohexyl carboxylate as the gel catalyst and 0.3 part of N-ethylmorpholine as the blowing catalyst was used. The rise time was 120 seconds and the foam had no apparent gel strength.

In another control reaction, 0.3 part of stannous 2-ethylhexoate was used as a gel catalyst and 0.3 part of N-ethylmorpholine was used as a blowing catalyst. The rise time was 85 seconds; the gel time was 95, and the exotherm was 110° C. Comparison of this control with e.g. Example 24 which used tributyltin laurate as gel catalyst reveals that use of the novel catalyst of this invention permits attainment, by synergistic effect, of decreased gel times and rise times or conversely the possibility of attaining the standard times with lesser quantities of catalyst mixture.

From Table II, it will be apparent that the product foams are satisfactory. Where the rise time or the gel time is lower than the hereinbefore noted preferred limits, these may be increased by decreasing the amount of blowing catalyst or gel catalyst; and vice versa. These product foams are completely free of the undesirable amine-derived odor which has heretofore characterized similar foams prepared by using amines such as N-ethylmorpholine as blowing catalyst; thus these foams can be readily used e.g. in clothing, etc. where prior art foams could not be used because of their obnoxious odor.

The novel catalyst mixtures of this invention which are suitable for use as blowing and gel catalysts in the production of polyurethane foams by the reaction of an organic compound having reactive hydrogen atoms as determined by the Zerewitinoff determination, water, and a polyisocyanate may contain a composition containing (a) a gelation catalyst, stannous soap $Sn(OCOR)_2$, and (b) a blowing catalyst $R'_3SnX$. These novel compositions are amine-free, odor-free, complete catalysts for polyurethane production. The novel product polyurethane foams obtained by the process of this invention find a wider variety of uses than polyurethanes heretofore known. In particular, they may have biocidal activity against *Staphylococcus aureus* and other bacteria; fungi, etc.

Although this invention has been described with reference to specific examples, it will be apparent that various modifications may be made thereto which fall within the scope of this invention.

We claim:

1. The method of making a cellular polyurethane plastic which comprises mixing an organic compound having reactive hydrogen atoms as determined by the Zerewitinoff reaction having a molecular weight of at least about 500, an organic polyisocyanate, water, and a catalytic amount of (a) a gel catalyst $Sn(OCOR)_2$ and (b) a blowing catalyst $R'_3SnX$ wherein R and R' are hydrocarbon radicals; and X is selected from the group consisting of negative residual portions of an organic carboxylic acid, a mercaptan, an alcohol, a phenol, and a halogen acid.

2. The method of claim 1 wherein said catalytic amount is 0.1%–5% of the said organic compound.

3. The method of claim 1 wherein said blowing catalyst is present in amount of 0.01–5 parts per part of said gel catalyst.

4. The method of claim 1 wherein R' is a lower alkyl radical having less than about 10 carbon atoms.

5. The method of claim 1 wherein said gel catalyst is selected from the group consisting of stannous 2-ethylhexoate and stannous oleate.

6. The method of claim 1 wherein said blowing catalyst is a tributyltin compound.

7. The method of claim 1 wherein said gel catalyst is stannous 2-ethylhexoate and said blowing catalyst is tributyltin laurate.

8. The method of making a cellular polyurethane plastic which comprises mixing an organic compound having reactive hydrogen atoms as determined by the Zerewitinoff reaction having a molecular weight of at least about 500, an organic polyisocyanate, water, and 0.1–5% based upon the said organic compound of (a) a gel catalyst $Sn(OCOR)_2$ and (b) a blowing catalyst $R'_3SnX$ wherein R and R' are hydrocarbon radicals; and X is selected from the group consisting of negative residual portions of an organic carboxylic acid, a mercaptan, an alcohol, a phenol, and a halogen acid; and wherein said blowing catalyst is present in amount of 0.01–5 parts per part of said gel catalyst.

9. The method of making a cellular polyurethane plastic which comprises mixing an organic compound having reactive hydrogen atoms as determined by the Zerewitinoff reaction having a molecular weight of at least about 500, an organic polyisocyanate, water, and 0.1%–5% based upon the said organic compound of (a) a gel catalyst $Sn(OCOR)_2$ and (b) a blowing catalyst $R'_3SnX$ wherein R is a hydrocarbon radical; R' is a lower alkyl radical having less than about 10 carbon atoms; and X is selected from the group consisting of negative residual portions of an organic carboxylic acid, a mercaptan, an alcohol, a phenol and a halogen acid; and wherein said blowing catalyst is present in amount of 0.1–5 parts per part of said gel catalyst.

10. The method of claim 9 wherein said gel catalyst is selected from the group consisting of stannous 2-ethylhexoate and stannous oleate.

References Cited by the Examiner

UNITED STATES PATENTS 2,602,783   7/52   Simon et al. _____ 260—2.5

FOREIGN PATENTS 1,212,252   10/59   France.

OTHER REFERENCES

Knox et al.: Foam Bulletin, Du Pont, Nov. 30, 1960, "Trouble Shooting Guide for Molding One-Shot Resilient Polyether Foam," 12 pp.

Saunders: "Rubber Chem. & Tech.," vol. 33, No. 5, December 1960, pp. 1299–1302.

Mobay Technical Information Bulletin, TIB No. 28–F9; July 20, 1959; 3 pages (pub. by Mobay Chemical Co., Pittsburgh 34, Pa.).

LEON J. BERCOVITZ, *Primary Examiner.*

DONALD E. CZAJA, *Examiner.*